United States Patent
Herberger et al.

(10) Patent No.: US 7,375,768 B2
(45) Date of Patent: May 20, 2008

(54) SYSTEM AND METHOD FOR AUTOMATIC CREATION OF DEVICE SPECIFIC HIGH DEFINITION MATERIAL

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 558 days.

(21) Appl. No.: 10/924,653

(22) Filed: Aug. 24, 2004

(65) Prior Publication Data

US 2006/0048057 A1 Mar. 2, 2006

(51) Int. Cl.
*H04N 9/74* (2006.01)

(52) U.S. Cl. .................. 348/584; 348/722; 348/578; 715/723; 715/726

(58) Field of Classification Search .............. 348/722, 348/578, 584, 588, 598, 555, 556, 445; 715/723, 715/722, 726, 798, 724; 382/284, 294, 309
See application file for complete search history.

(56) References Cited

U.S. PATENT DOCUMENTS

| | | | |
|---|---|---|---|
| 5,610,661 A | | 3/1997 | Bhatt |
| 5,649,171 A | | 7/1997 | Craven et al. |
| 5,852,435 A | * | 12/1998 | Vigneaux et al. ............ 345/428 |
| 5,999,220 A | | 12/1999 | Washino |
| 6,154,600 A | | 11/2000 | Newman et al. |
| 6,204,840 B1 | * | 3/2001 | Petelycky et al. ........ 715/500.1 |
| 6,226,038 B1 | | 5/2001 | Frink et al. |
| 6,229,576 B1 | | 5/2001 | Tarr et al. |
| 6,370,198 B1 | | 4/2002 | Washino |
| 6,493,008 B1 | * | 12/2002 | Yui ............................ 715/840 |
| 6,678,002 B2 | | 1/2004 | Frink et al. |
| 6,897,880 B2 | * | 5/2005 | Samra ......................... 345/619 |
| 6,941,276 B2 | * | 9/2005 | Haeberli ....................... 705/26 |
| 6,943,845 B2 | * | 9/2005 | Mizutome et al. ........... 348/555 |
| 6,961,097 B2 | * | 11/2005 | Yui ............................. 348/584 |
| 7,024,677 B1 | * | 4/2006 | Snyder et al. ................ 725/86 |
| 7,042,517 B2 | * | 5/2006 | Hirano ........................ 345/588 |
| 7,055,100 B2 | * | 5/2006 | Moriwake et al. ........... 715/723 |
| 7,073,127 B2 | * | 7/2006 | Zhao et al. .................. 715/719 |
| 7,103,840 B2 | * | 9/2006 | Ihara et al. .................. 715/726 |

(Continued)

FOREIGN PATENT DOCUMENTS

EP 0871177 A2 10/1998

OTHER PUBLICATIONS

Microsoft web pages describing photo editing software.

(Continued)

*Primary Examiner*—David Ometz
*Assistant Examiner*—Jean W. Désir
(74) *Attorney, Agent, or Firm*—Fellers, Snider, Blankenship, Bailey & Tippens, P.C.; Terry L. Watt

(57) ABSTRACT

There is provided herein a system and method for adapting high resolution input material to display specifications of a particular display device, thereby ensuring that the high quality of the input material is preserved as best as possible in the final video work. The instant invention is an improvement over traditional media editing programs, in that controls are provided to ensure the quality of the final product. Additionally specific movement effects selectable when working with still images are also separately monitored by the instant invention to ensure an efficient application of these effects, thereby preserving the visual quality of the material.

10 Claims, 7 Drawing Sheets

U.S. PATENT DOCUMENTS

| | | | |
|---|---|---|---|
| 7,119,849 B2 * | 10/2006 | Yui et al. | 348/564 |
| 7,154,558 B2 * | 12/2006 | Yui et al. | 348/565 |
| 7,207,006 B1 * | 4/2007 | Feig et al. | 715/723 |
| 7,222,300 B2 * | 5/2007 | Toyama et al. | 715/723 |
| 7,224,404 B2 * | 5/2007 | An et al. | 348/584 |
| 2001/0002851 A1 * | 6/2001 | Shimada et al. | 348/423.1 |
| 2001/0017667 A1 | 8/2001 | Frink et al. | |
| 2001/0036356 A1 * | 11/2001 | Weaver et al. | 386/52 |
| 2001/0040592 A1 * | 11/2001 | Foreman et al. | 345/723 |
| 2002/0054112 A1 * | 5/2002 | Hasegawa et al. | 345/764 |
| 2002/0054116 A1 * | 5/2002 | Pavley et al. | 345/765 |
| 2002/0094193 A1 | 7/2002 | Tao et al. | |
| 2002/0114613 A1 | 8/2002 | Thai | |
| 2002/0116716 A1 * | 8/2002 | Sideman | 725/91 |
| 2003/0031461 A1 | 2/2003 | Takayama | |
| 2003/0214603 A1 | 11/2003 | Manning | |
| 2004/0017508 A1 | 1/2004 | Huang | |
| 2004/0041943 A1 * | 3/2004 | Fecht et al. | 348/441 |

OTHER PUBLICATIONS

Microsoft web pages describing Plus! photo editing software.
Manifest Technology web pages describing different video editing software.

* cited by examiner

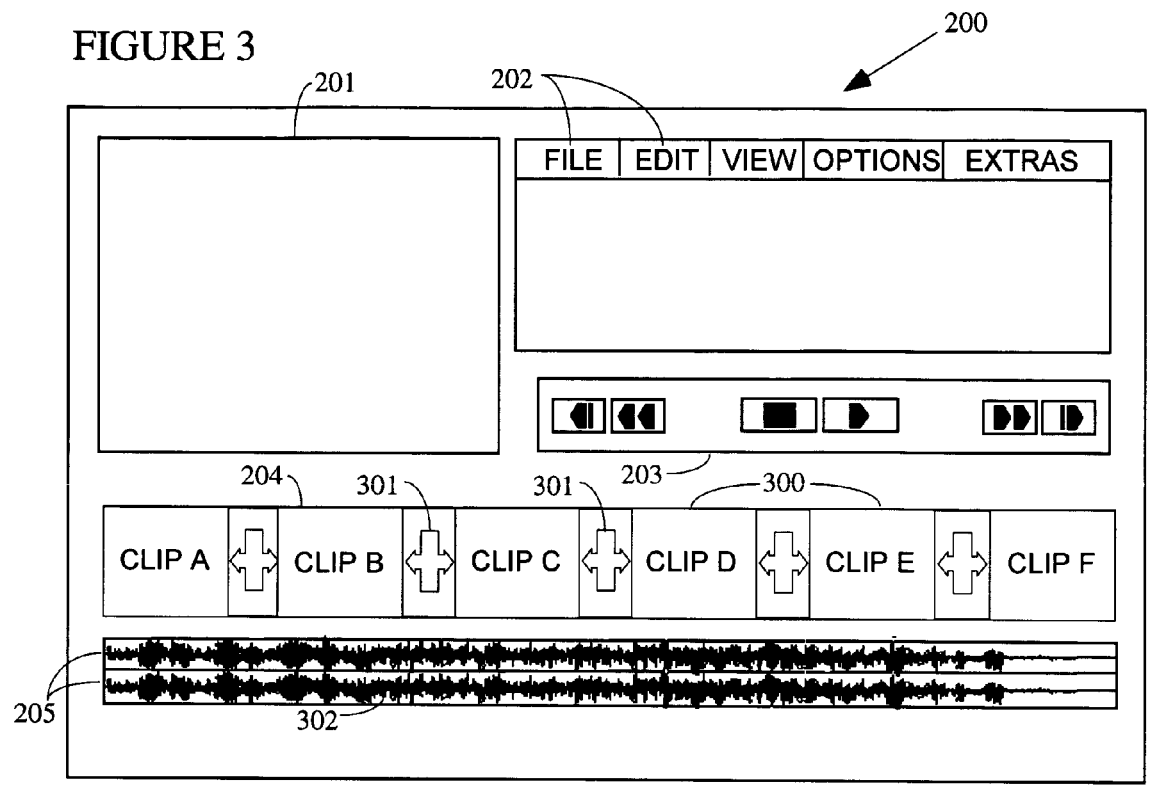
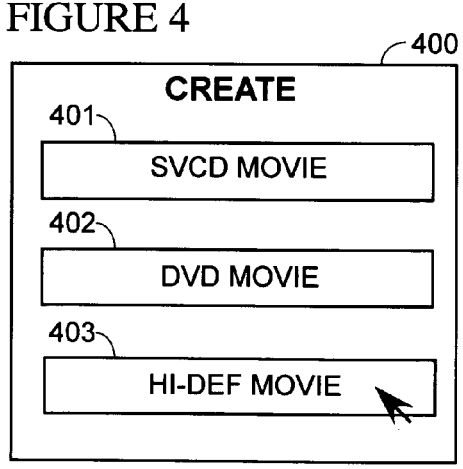
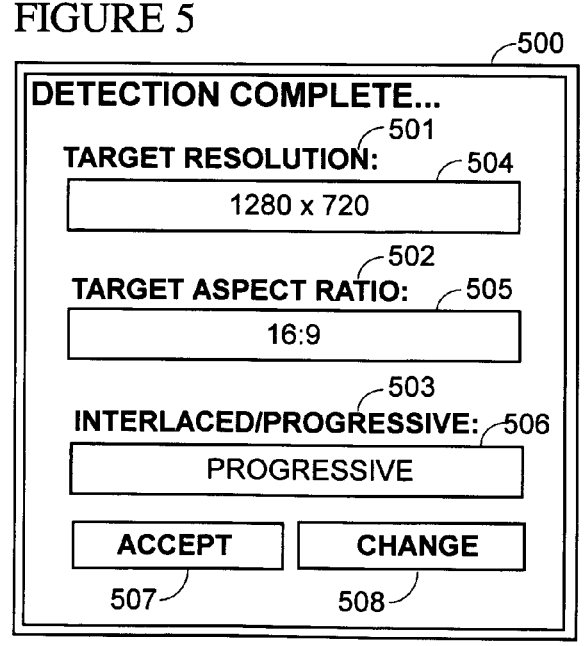

SYSTEM AND METHOD FOR AUTOMATIC CREATION OF DEVICE SPECIFIC HIGH DEFINITION MATERIAL

FIELD OF THE INVENTION

The present invention relates generally to the field of creating and editing high definition video data and, more particularly but not by way of limitation, to a process that allows a user to create high definition output material from high definition input material, wherein the output material is automatically adapted to the specifications of a selected display device.

BACKGROUND OF THE INVENTION

The term "High Definition" is often used in connection with HDTV and is generally associated with a better picture quality than was available via the older broadcast standards such as PAL or NTSC. The improved quality is achieved by using higher picture resolutions and also a higher bit transmission rate as compared with older television standards. Terms such as 720p and 1080i are often used to describe the high definition TV formats, with 720p referring to a picture with 720 vertical lines, each with 1280 pixels horizontally which amounts to a resolution of 1280×720 pixels. The "p" suffix in the 720p format indicates that progressive scanning is used, which means that each scan includes every line for a complete picture (i.e., the picture is not interlaced). Similarly, the 1080i format corresponds to a picture with 1080 vertical lines, each with 1920 pixels horizontally, which translates to a resolution of 1920×1080 pixels. The 1080i format utilizes interlaced scanning, which alternates sending odd lines and even scan lines. As compared to the standard 525 lines of resolution used in the United States or the 625 lines used in Europe, high definition TV delivers a much cleaner, sharper and better picture.

The trend toward higher resolution images has also found its way into the computer display industry, with high definition in this context generally referring to resolutions that are higher than the so called standard personal computer resolutions. Standard PC resolutions might be, for example, 1024×768 pixels or 1280×1024 pixels. Of course, in the last few years personal computers have become multimedia centres and users expect their computers to be able to create, display, edit, and process a wide variety of multimedia data formats including, for example, video data, music data, photo data, etc.

Concomitant with an increase in raw computer processing power that has been the trend in recent years, users have seen a broadening in the sorts of devices that can create and play digital (multimedia) content. Traditional sources of digital input (e.g., digital still cameras, scanners, digital movie cameras, digitized analog photographs/video clips, etc.) have been enhanced to provide additional multimedia content (e.g., digital still cameras can now take movies and record audio) and new capabilities have been added to devices that have not traditionally been used as multimedia data sources (e.g., digital photos may be obtained from cellular phones, PDAs, etc.). Of course, even consumer-level digital cameras have resolutions that are far beyond—and in a different aspect ratio than—the 1080i HD standard. For example, a 4 megapixel camera produces a digital image with dimension of about 2200 by 1700 pixels at full resolution. The situation is similar with respect to some digital video cameras and the resolution discrepancy between digital cameras and the standard HD formats will likely only get worse as the resolution of those devices continues to increase.

Of course, improvements in peripheral technology would be of little practical importance to a consumer if these digital devices could not be easily interconnected with a personal computer. Interconnectivity requires, of course, an appropriate hardware interface as well as software to read and store the digital data taken from the originating device.

These advances in technology, however, have left the average consumer with the perplexing and difficult task of combining together digital multimedia files from a variety of different sources, each of which was potentially acquired at a different resolution. Further, the consumer that desires to create high definition video output is faced with the difficult task of determining exactly how digital images that were taken at a variety of different resolutions (e.g., 2272×1704 pixels or 2816×2112 pixels) are to be resized and/or cropped to make such images compatible with one of the HD standards. Further, in order to produce the best possible movie product the creator will need to be knowledgeable as to which of the current HD standards will be used to view the completed work or, minimally, the resolution of the intended viewing device. Thus, the best quality movie will be one that takes into consideration both the HD standard and the specification of the available display device(s).

Of course, this sort of detailed knowledge may not be readily available to the hobbyist end user. Video display technology has complicated the matter even further. For example in recent years digitalisation has become common place in the field of the display devices with displays such as TFT displays, digital TVs, and digital projectors reaching broad distribution by virtue of their quality and steadily decreasing prices. Since, a TFT display directly controls each pixel in the display, devices such as this are really only suitable for use at a single predefined resolution if the best possible image/display quality is desired. At other non-preferred resolutions, the image that is presented to the viewer will be of less than optimal quality because it is an interpolated (or edited) version of the original.

Thus, the user who wants to create a work from high resolution input material that is visually attractive to a subsequent viewer will want to know the preferred resolution of the viewer's display device or, in the case of the HD broadcast standards, which standard to apply (e.g., 720p or 1080i). Further, the user will also need to understand and select the aspect ratio of the output material since, for example, most digital photo devices produce photographs in an aspect ratio of 4:3, which those of ordinary skill in the art will understand to mean that the horizontal and vertical dimensions of the image are in the ratio of 4 to 3. However, high definition displays are usually best suited for display of materials that have an aspect ratio of 16:9. Still further, the novice user will need to understand the difference between interlaced and non-interlaced displays—and whether the intended display device is capable of displaying same—in order to create the best possible video product.

Finally, many casual users will not be familiar with the sorts of decisions that may need to be made when a digital still photo (or video clip) is edited or where special effects are applied thereto. That is, many users do not understand that digital effects such as zooming, panning, scrolling, scaling, etc., must be performed at the resolution of the intended output device if the best possible product is to be obtained. For example, it is generally desirable not to zoom into an image beyond the point where the pixel ratio is in excess of 1:1 because of the degraded image that results (e.g., blockiness or "pixelation" can be created in the image in an attempt to fill the screen). However, this degradation can be de-emphasised by using interpolation (rather than replication) if the user knows enough to select this option. Even so, the user may not realize that even though the on-screen appearance during editing of a video work is acceptable, the final product (because of its higher resolution) might not be. Similarly, when digital effects and transitions are applied, the output must be at a resolution that is commensurate with that of the display medium if the result is to be the most pleasing.

As a consequence, the user who desires to create the best possible video work is confronted with a wide variety of technical options, the correct selections of which may be beyond his or her experience or training. In such a circumstance the user may very well be overwhelmed with the technical details and make parameter choices that yield an inferior movie which, in turn, can lead to frustration with the process.

Thus what is needed is a method that releases the user from the need to specify each of a host of settings when creating high definition output material from high definition input material so that the output preserves the high quality of the input, at least in so far as that is possible.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would assist a user in creating high definition video works from sources of different resolutions, aspect ratios, etc. and which does not exhibit the limitations of prior art systems and methods.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for automatically creating high definition output material from high definition input material in such a way as to preserve as much as possible the quality of the input material upon its subsequent viewing. In more particular, a method is taught herein that is primarily intended for use by professionals and novices in the digital video production area. The instant invention enables a user to automatically create high definition video output from high definition input without requiring any particular knowledge of the technical aspects of the process.

According to a first aspect, the instant invention functions as an extension of a photo editing program. In this embodiment, a computer program is provided which allows a user to create and edit a video work that is comprised of a variety of different input sources, including digital still images. Preferably, this program will allow the user to apply traditional (e.g., static) digital effects as well as effects that are designed to create the illusion of movement (e.g., pan, scroll, rotation, zoom, etc.).

After the input source material (which might include digital still photos, video clips, sound track files, etc.) has been assembled and ordered, the instant invention will be invoked to create a video work suitable for viewing by others. Note that the term video work should be interpreted as broadly as possible herein and refers generally to a multimedia work suitable for viewing on a display device. Preferably the work will have user-defined scenes and, optionally, user-specified transitions and effects that are to be applied thereto. Additionally it is possible that included as part of the work will be digital still photos, text pages (with or without background), an intro/outro, etc., all of which are suitable for use with the instant invention.

As a first preferred step, the user will select the output format for the created video work. The user will preferably be able to select from a variety of different output formats, for example "DVD-Movie", "SVCD-Movie" or "Hi-Def Movie", etc. Each of these selectable output formats have specifications associated therewith including, for example, a resolution, bit rate and aspect ratio. The specifications for the DVD and SVCD standards are well known and thus will not be described here. On the other hand, there is no universally accepted specification for "Hi-Def Movie", but at such a time when a standard is established the instant invention will readily be able to accommodate such according to the methods taught herein.

In a preferred arrangement, during the editing process the user will preferably not directly edit the source material. Instead, edit instructions will preferably be accumulated and applied at the appropriate resolution after the output format has been specified.

As a next preferred step, the instant invention performs an automatic check of the display devices connected to the personal computer upon which the editing program is running. One goal of this inquiry is to determine the combination of parameters that will yield an optimal image on the attached device(s). Such device-specific parameters might include its resolution, the preferred aspect ratio and whether an interlaced or progressive video signal may be accommodated. This check will preferably be carried out automatically and sets various internal operating parameters without intervention by and, preferably, without the knowledge of, the user. Although the results of the parameter determination are by default preferably not displayed to the user, it is anticipated that in some cases a mechanism will be provided for the user to view and later alter them. Preferably, the user will be allowed to adjust certain of the parameters within a range that is best suited for the intended display device. Whether or not a user will be allowed to alter parameters to the extent that the video that results would be non-compliant with a published standard (or less than optimal for the selected display device) will be up to the program designer. However, in the event that such is allowed it would be preferred that the user be informed of such a change before it is implemented.

In another preferred arrangement, rather than querying attached devices, the user will be presented with a menu of display devices and asked to select among them. As might be expected, the parameters associated with each of the display devices that is presented to the user will preferably be made a part of the program. Those of ordinary skill in the art will recognize that such a display list could readily be kept current by providing the user with an Internet link to periodically download updated display information and specifications for new devices.

As a next preferred step the instant invention applies the edits previously selected by the user during the editing step. The instant inventors contemplate that potentially any editing step or algorithm that it is possible to apply to video data could potentially be implemented within the context of the instant invention, depending on the desires of the designer. During this aspect of the instant invention, any additional content that has been selected by the user (whether static digital images, visual/auditory effects, etc.) will be assembled, if it has not been gathered already. During this step the program will preferably try to ensure that the content is the same resolution as the previously defined target resolution. Preferably, the instant invention will achieve this aim through the use of a specialized database. In a first variant the database will contain pointers to content that has been pre-stored in several different resolutions (e.g., 1280×1024 pixels or 1024×768 pixels). This arrangement allows the instant invention to rapidly locate a resolution that corresponds to the resolution of the selected display device. In a second variant the content is stored in a resolution that is greater than any anticipated output so it can be quickly down-sampled (or otherwise lowered in resolution) to match the characteristics of the selected output device.

As a next preferred step, if the user has selected movement-type effects, an analysis will be performed to determine the impact of the application of the selected effect(s) on the output. In one preferred arrangement, the image will be examined for breaks in the pixel ratio (which breaks indicate a degradation in image quality) and, if such are detected, the user will be informed of the break and will be invited to change either the effect or the pixel ratio. By way of example only, a pixel break would occur if the user has requested a "zoom" effect that causes the pixel ratio to be in excess of 1:1. If the instant invention does not detect a break in the pixel ratio the next step is initiated.

In a next preferred step the instant invention renders the output video work and writes it to disk or other non-volatile storage. As part of this process, the user's editing instructions are implemented (in accordance with the targeted resolution, aspect ratio, etc.) and, if required, content is read according to pointers in the image database.

In a preferred final step of the instant invention, the output video will be stored on a non-volatile storage medium, preferably along with a replay tool that has been optimised to allow for a display of the output material in the best quality possible on the selected device.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which:

FIG. 3 illustrates the graphical user interface of the instant invention at a second phase.

FIG. 4 depicts the graphical user interface of the screen when selecting the output format FIG. 5 depicts the graphical user interface of the instant invention after the automatic detection process.

DESCRIPTION OF THE PREFERRED EMBODIMENTS

Figure 1:
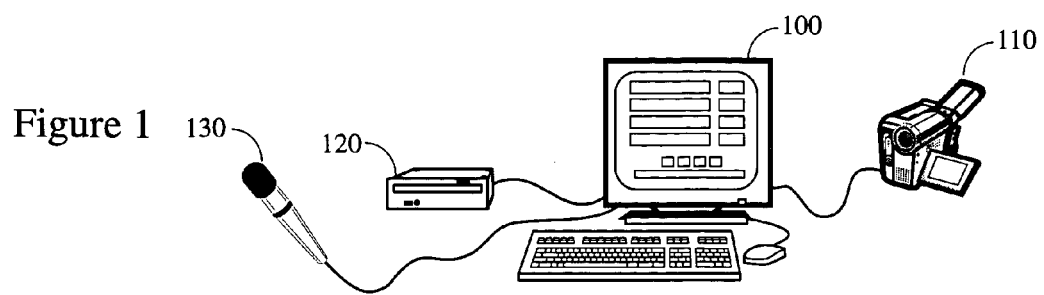
FIG. 1 illustrates a preferred environment for the instant invention.

Referring now to the drawings, wherein like reference numerals indicate the same parts throughout the several views, there is provided a preferred system and method for the automatic adaptation of input material to display-device specific settings so that the resulting video work as best as possible preserves the quality of the input material.

By way of general explanation and in accord with the preferred embodiment, it is to be understood that when the phrase "automatic adaptation" of input material is used herein that usage will preferably be interpreted to mean adjusting the parameters/pixel count of input materials to cause it to conform to a selected display device, wherein the parameters are chosen so as to produce a near-best quality final product as it will appear when viewed on the selected display device.

One preferred aspect of the instant invention will feature an automatic analysis of attached display devices to gather the display parameter values for use during the video rendering process. Additionally the instant invention preferably utilizes a database structure with additional content that may be added to the video work by the user during its creation, such content preferably including (or including pointers to) multiple bit-resolutions of the same images. Also the instant invention preferably controls the effects that a user has selected for application to the input data, the purpose of such control being to cause the rendered movie output to be of the highest quality possible in light of the selected device parameters.

As is generally indicated in FIG. 1, at least a portion of the instant invention will be implemented in form of software running on a user's computer 100. Such a computer will have some amount of program memory and hard disk storage (whether internal or accessible via a network) as is conventionally utilized by such units.

Additionally it is possible that an external camera 110 of some sort might be utilized with and will preferably be connectible to the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation or in the viewing of his or her multimedia work. Further given the modem trend toward incorporation of cameras into other electronic components (e.g. in handheld computers, telephones, laptops, etc.) those of ordinary skill in the art will recognize that the camera might be integrated into the computer or into some other electronic device and, thus, might not be a traditional single-purposes video or still camera. Although the camera will preferably be digital in nature, any sort of camera might be used, provided that the proper interfacing between it and the computer is utilized. Additionally a microphone 130 might be utilized so that the user can add voice-over narration to the multimedia work and a CD or DVD burner 120 could be useful for storing in-progress or completed works.

Figure 2:
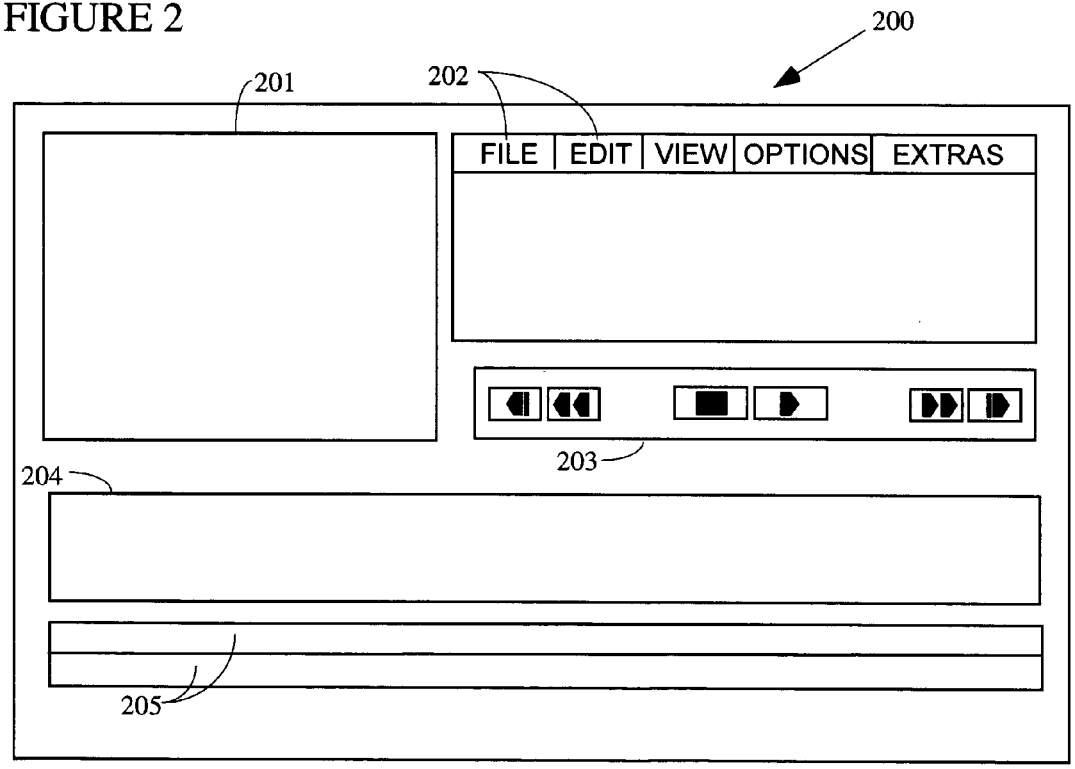
FIG. 2 illustrates the graphical user interface of the instant invention in a first phase.

As is generally indicated in FIG. 2, in a preferred embodiment a user of the instant multimedia editing system will be presented with graphic user interface 200 of the sort depicted in this figure. For example, and as is typical with video editing programs, menu items 202 will preferably be provided to allow a user to interact with the underlying program. Menu choices that would preferably be offered include "file" related commands (e.g., open, close, new, etc.), editing commands (e.g., cut, paste, copy, etc.), as well as various viewing and program dependent options related to the editing process. Additionally, the user will preferably be provided with selectable tracks (video 204 and/or audio 205) wherein multimedia content may be stored and manipulated. The video track 204 (only a single video track has been shown for purposes of illustration only) is designed to contain video clips or digital still photos. The audio tracks 205 (only two tracks are shown as would be appropriate for stereo sound sources) are designed to accommodate audio clips. Typically, the content that is stored in the audio 205 and video 204 tracks would be provided by the user.

On-screen transport controls 203 are preferably styled to resemble their counterparts on a conventional VCR and provide a way for the user to use a computer mouse to control the playback of the multimedia work through the use of familiar functions such as rewind, play, stop/record, fast forward etc. Those of ordinary skill in the art will recognize that such transport controls 203 are commonplace and well known in media editing programs. It is also typical in such programs to devote some portion of the screen to a view window 201 wherein the multimedia work may be viewed during the time that it is being assembled and edited.

Turning next to FIG. 3, this figure illustrates how the graphic user interface of FIG. 2 might appear after the user has created or added content to the on-screen tracks. As is suggested by this figure, the user has inserted clips 300 into the visual content track 204, each of these clips potentially being either—still images or a video clip. Preferably each selected video clip or still image will be represented within the graphic user interface by a lower resolution thumbnail graphic that allows the user to readily identify it. Additionally, in a preferred arrangement the graphical user interface utilizes separators 301 between each clip 300. When one of the separators 301 is selected the user will preferably be allowed to specify the transition effect that is to be applied between two consecutive images or video clips. Additionally, it is anticipated that the user will be able to select from among a variety of other editing options that would allow the resulting video work to be further customized including, by way of example, rearranging slides/video clips, applying digital effects, applying movement effects (pan, scan, zoom, etc.), etc. Indeed, it is anticipated that the user will have the full functionality of a media editing system at his or her disposal, such functionality being well known to someone of ordinary skill in the art. Additionally, it is anticipated that the user might be allowed to insert/modify audio material 302 into the audio tracks 205 as is commonly done in video editing programs.

FIG. 4 illustrates a preferred visual implementation of one aspect of the graphical user interface of the instant invention. This menu 400 will be used to select the type of video output that is desired. Although this menu might be presented to the user at any time, in the preferred arrangement it will first be encountered after the video work has been assembled and edited. As is indicated in this figure, the user will preferably be presented with an option to choose the output format for the finished video work. In the example of FIG. 4, the user will be able to select one out of three possible output formats, "SVCD Movie" 401, "DVD MOVIE" 402 and "HI-DEF MOVIE" 403, with the selection of the last option invoking the methods of the instant invention. It should also be noted that this selection screen 400 with its three possible selections is only shown for purposes of illustration. It is certainly possible that more than three output formats would be provided.

FIG. 5 illustrates another aspect of the graphical user interface of the instant invention. In more particular, the menu 500 might be presented to the user after he or she has selected the "HI-DEF MOVIE" 403 output format. This menu 500 will display the relevant data values (e.g., target resolution 501, target aspect ratio 502, interlaced/progressive scan 503, etc.) that have been gathered during the automatic analysis phase of the instant invention (to be discussed below). Preferably the user will be allowed to review and modify the parameters displayed in this menu 500 and will ultimately be asked to accept 507 or modify 508 them. Typical parameter values have been posted in this menu 500 for purposes of illustration. More particularly, the various fields within the menu 500 indicate that, based on a query of the attached hardware, the target resolution is 1280×720 pixels 504, the aspect ratio is to be 16:9 505, and the output video work is to be produced with a progressive setting 506. Preferably, the user will be allowed to modify these values if that is desired.

It should be noted that a graphical user interface like the one illustrated in FIG. 5 is an optional display for the user. In some preferred arrangements, the parameter values will be ascertained and then automatically assigned without giving the user the option of modifying them Turning next to FIG. 6, in this figure is illustrated another possible user interface element, i.e., one that requires the user to manually select the parameter values needed in order to create a "HI-DEF MOVIE". Such a user interface might be presented to the user in two typical cases. First, if the user wishes to manually change the parameters returned via the automatic analysis of attached devices and, second, if the user wishes to create high definition output material for a display device different from that which is currently connected to the computer. A preferred format of a graphical user interface 600 would contain various fields 602 through 606 that are intended to contain parameters that are related to the chosen display device 601.

Figure 6:
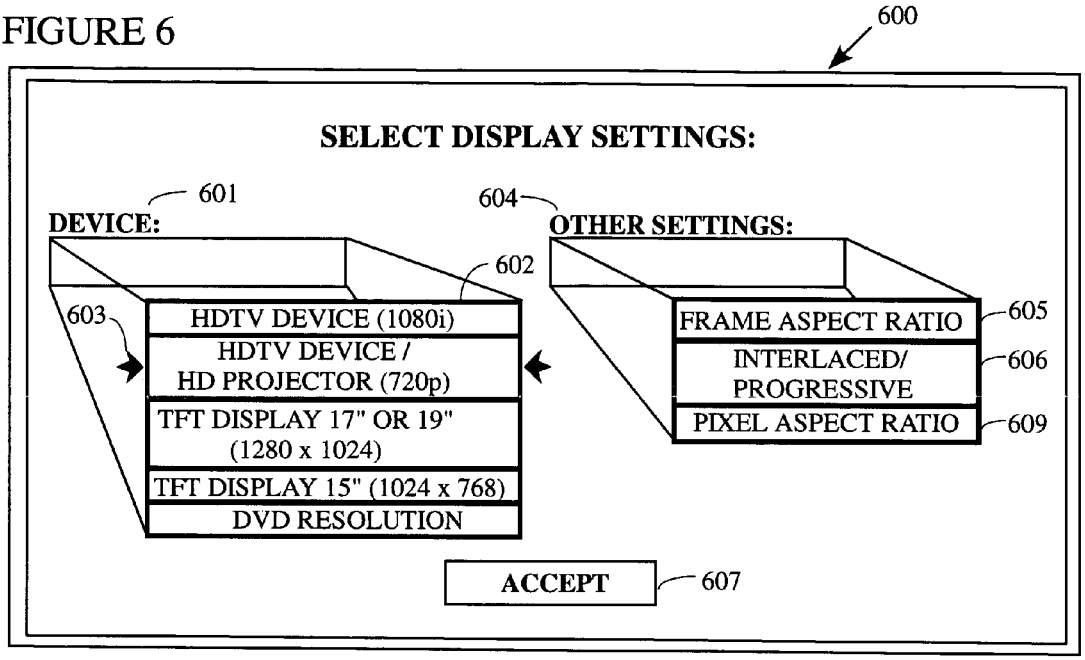
FIG. 6 illustrates the graphical user interface of the instant invention when selecting the simplified manual definition process.

As has been discussed previously, in the preferred arrangement the instant method will automatically determine the HD parameters for any attached display devices. In one preferred arrangement and as is illustrated in FIG. 6, those parameters that have been actually determined from the attached display will be marked with an indicator such as the arrow 603, with parameters that have been modified by the user (or that are assigned by default) not bearing this designation. In this figure, only the HDTV device type has such a designator 603.

As is further suggested in FIG. 6, in some cases additional parameters will be accounted for during the creation of the user's movie. For example, the aspect ratio 605 and the interlaced/progressive setting 606 are two such parameters.

Additionally, in some cases it may be necessary to modify the pixel aspect ratio of an image to avoid the distortion that can arise when images from, e.g., a digital camera are converted to video (item 609). Note that this is to be distinguished from the frame aspect ratio parameter 605 which refers to ratio of the vertical frame size to the horizontal frame size. By way of explanation, those of ordinary skill in the art will understand that images from digital cameras and the like have "square" pixels. For example, a horizontal line that is 100 pixels long will appear to be of the same length as a vertical line 100 pixels long when those lines are viewed on a computer screen. However, when those same two lines are displayed on some video devices the vertical line may be longer than the horizontal line or vice versa. This discrepancy can cause digital images to appear distorted (e.g., stretched horizontally or vertically) and, additionally, can cause digital image filters to produce unexpected results (e.g., a blur filter with a radially symmetric kernel may not operate correctly on non-square pixels). As a consequence it may be necessary to adjust the dimensions of digital images to compensate for and reduce the effects of such distortion. If the pixel aspect ratio is other than 1:1, such an adjustment may be necessary. Those of ordinary skill in the art will understand how this transformation may be performed.

Finally, once the user is satisfied with the parameter configuration, a button 607 has been provided to signal that fact to the controlling computer program. Upon receipt of this signal, the compiled and edited work will preferably be rendered and written to output as is discussed in greater detail below.

Figure 7A:
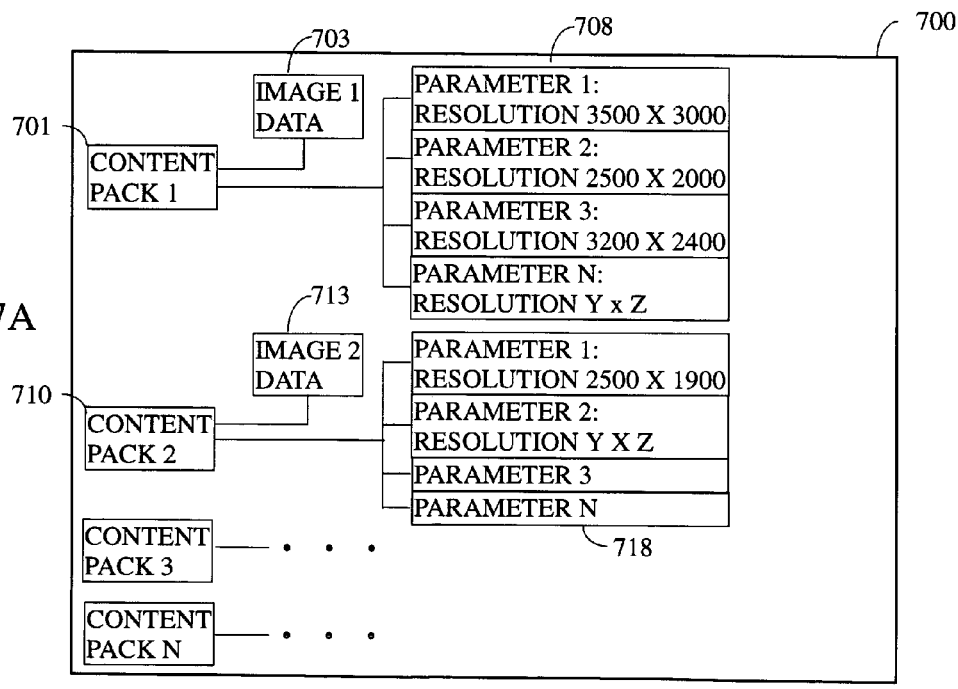
FIGS. 7A and 7B illustrate the two different content databases that are applicable by the instant invention.
Figure 7B:
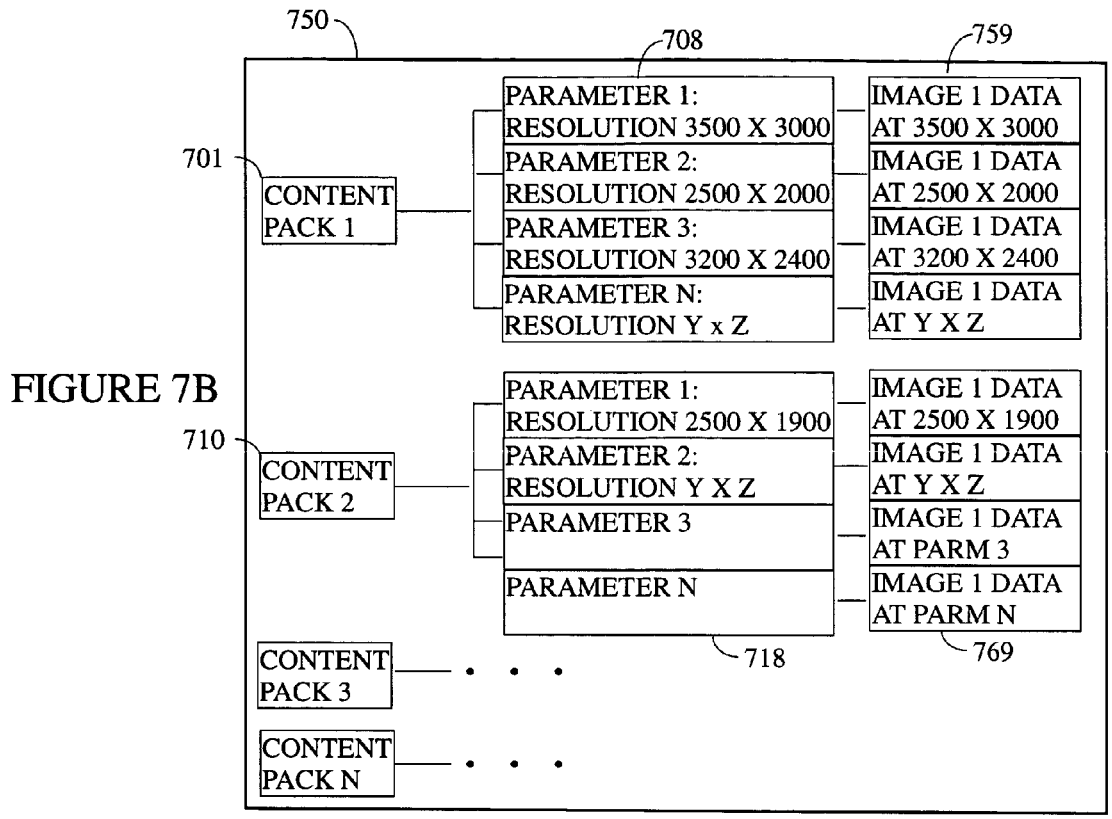

FIGS. 7A and 7B contain schematic illustrations of preferred database structures 700 and 750 that would be suitable for use with the instant invention. As an initial matter, it should be noted that, although the embodiments of FIGS. 7A and 7B are shown separately it is certainly possible that they could be combined into a single database if that were desired. Turning first to FIG. 7A, in this embodiment the preferred database structure 700 included a plurality of content packs 701 and 710. Each of these packs 701/710 is preferably associated with different image data 703/713 (e.g., a digital still photo, a movie clip, etc.), each such item of image data 703/713 being stored within the database at a resolution that exceeds the highest contemplated resolution that will be selected by the user. Of course, alternatively the database might contain pointers to separate computer files that contain the image data 703/713 so that the data need not actually be stored within the database file 700. Associated with each image item are one or more parameter settings 708/718 that describe that particular item of image data 703/713. For example, the parameter values 708 in FIG. 7A indicate that the associated image 1 data 703 is stored at a resolution of 3500×3000 pixels or at 2500×2000 pixels, etc. Said another way, the image data 703 has been selected and stored within the database 700 along with the attendant parameter values 708 because the image 703 can be displayed at the indicated resolutions without seriously degrading it. The various parameter combinations that are stored in the database indicate different versions of the underlying image or video clip that can be displayed at full resolution.

Continuing with the example of FIG. 7A, typically, the actual dimensions of the original image 703 will be at least 3500×3000, thereby ensuring that it can be resized to the other resolutions listed in the database without sacrificing its appearance in the final video work. As a consequence, when an image is selected by the user for inclusion in the video work, the editing program will be able to immediately determine whether or not the selected image/film clip will display at the user's selected output resolution by simply examining the parameters within the database that are associated with the selected image. Note that in the case that the user decides to utilize an image item at a resolution other than its native resolution, the editing program will be responsible for converting the stored image 703 to the proper resolution according to methods well known to those of ordinary skill in the art (e.g., via numerical interpolation). Finally, it should be understood that, although the example of FIG. 7 was discussed in terms of the image dimension/resolution parameters, this was only for purposes of illustration only and any other image parameter (e.g., bit depth, pixel aspect ratio, etc.) could have been used instead.

In one preferred arrangement, the content database 700 will contain transitional effects or digital still images that can be integrated into the video work by the user during its creation process. With respect to the transition digital images, in one preferred variation graphic images will be stored in the database that can be used, for example, as templates in creating transitions between two video clips. For example, an image might be included (at a variety of resolutions) that had regions set aside for user-provided text, e.g., an image of a birthday cake with a place for adding text such as "Happy Birthday Caroline—Jun. 1, 2004". Additionally, the parameters for conventional video transitions could also be stored in the database, the parameters having been selected to yield output images that are in compliance with the selected HD format.

Turning next to FIG. 7B, in this preferred embodiment the database 750 contains a listing of acceptable parameters for use with each image as was discussed previously in connection with FIG. 7A. However, in this case there is additionally provided a stored pre-calculated image 759 that was obtained by using the parameter values indicated. That is, for each parameter selection 705 there is a corresponding version of the image 1 data 703 that has been pre-calculated using the indicated parameter value(s). In the example of FIG. 7B this means that the image 1 data 703 is stored at "N" different resolutions. The obvious advantage of this approach is that the editing program can quickly assemble the components of the video work for output, as some of the image conversions have been calculated in advance. Of course, it is certainly possible that the original image data could additionally be provided to the database 750 as was the case with database 700.

Figure 8:
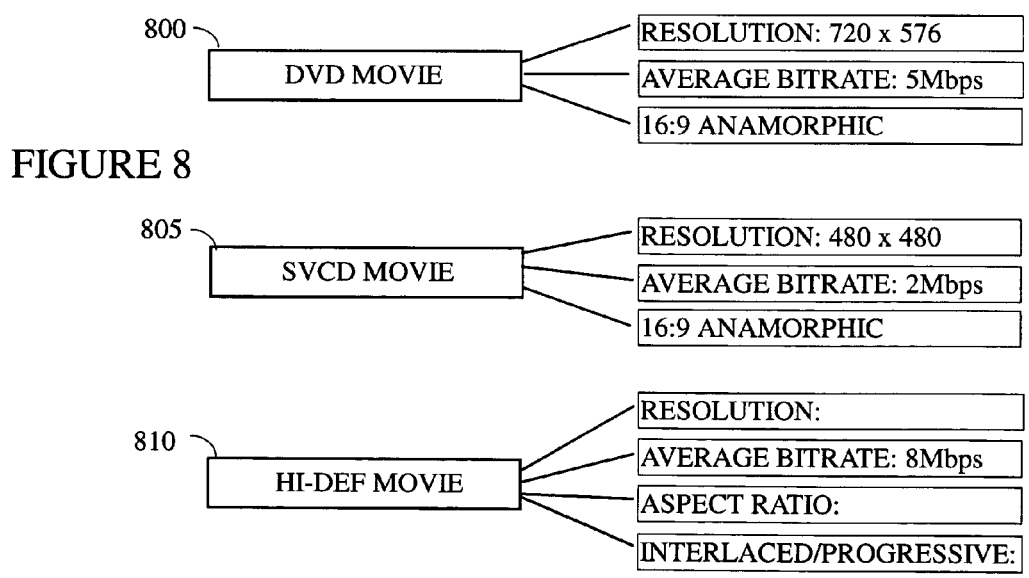
FIG. 8 depicts the specific data values associated with the selectable output formats.

FIG. 8 illustrates some preferred data types and values for video output formats that might be selected by a user of the instant invention. The format "DVD MOVIE" 800 will preferably contain the following sorts of parameter types: resolution (e.g., 720×576 pixels), bit rate (e.g., 5 Mbps) and aspect ratio (e.g., anamorphic). It should be noted that the parameter values of FIG. 8 are compliant with the DVD standard and, thus, the user will want to use these settings if compliance with that particular standard is desired. When the selected output format is "SVCD MOVIE" 805 the parameter types are the same as for "DVD MOVIE" 800 but some of the parameters take different values: the resolution is 480×480 pixels, the average bit rate is 2 Mbps and the aspect ratio is set to 16:9 anamorphic. Finally, the format "HI-DEF MOVIE" 810 utilizes the same data types as those discussed previously and at least one additional parameter: the interlaced/progressive data type. An additional difference between the "HI-DEF MOVIE" 810 format and the others is that the resolution and aspect ratio have not been assigned specific values. Instead, it is generally understood that the average bit rate for this format is at least 8 Mbps and the aspect ratio will be selectable from several different values, depending on the attached viewing device(s).

Figure 9:
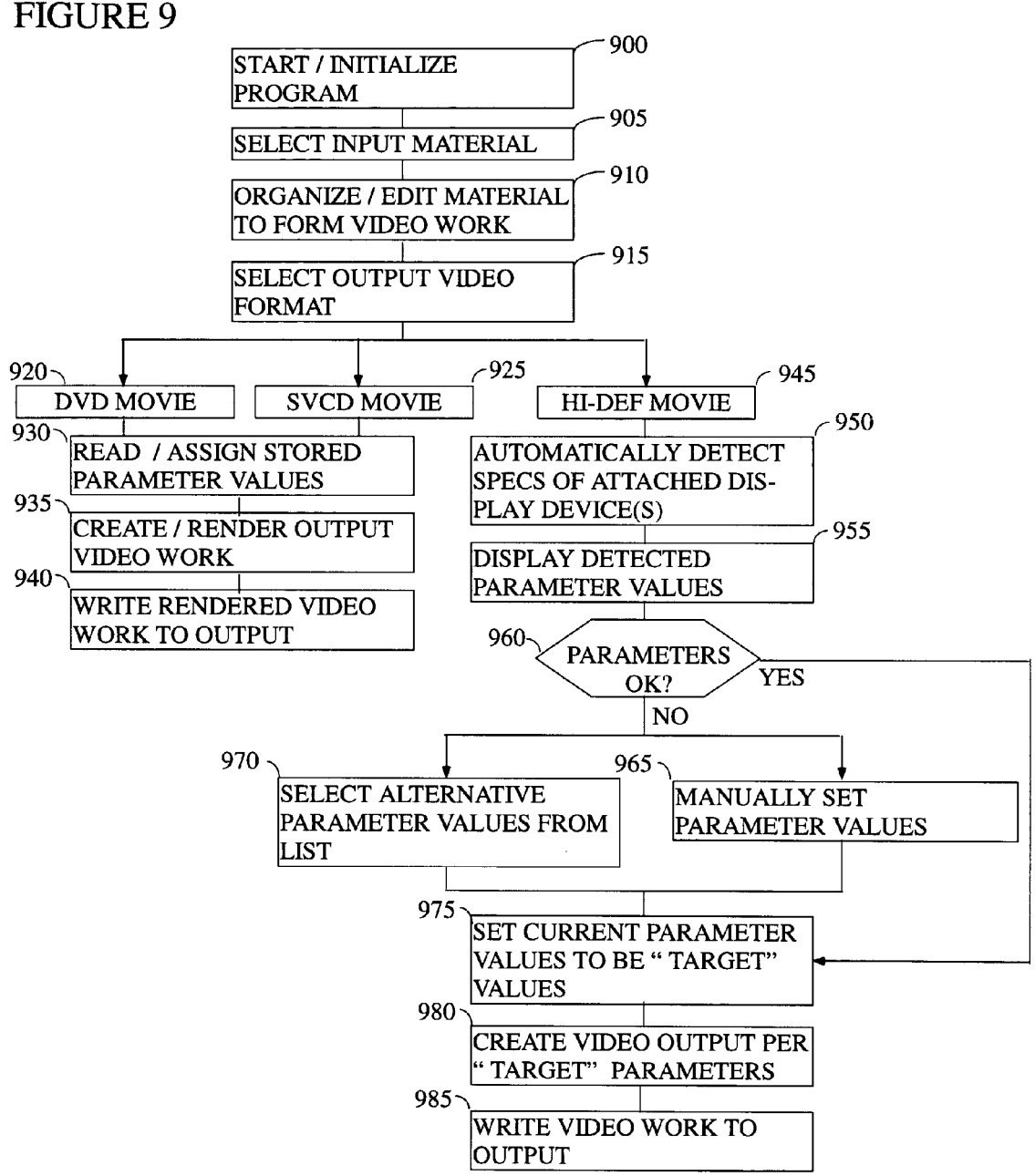
FIG. 9 contains a flowchart which illustrates the specific steps of the instant invention in a first part of the creation process

Turning next to FIG. 9, wherein an overview of some preferred steps in the instant invention are displayed, as an initial preferred step 900 the program will be started and initialised according to methods well known to those of ordinary skill in the art. Next the user will preferably select the video and still images that will be used in the instant movie (step 905). Preferably, the selected material will be high resolution for reasons discussed previously. Next, the user will preferably organize and edit (step 910) the selected input material to form a video work. It is anticipated that as part of this step the user might specify transitions and/or video effects.

As a next preferred step, the user will select an output format (step 915) for the video work. The user will preferably be offered at least three possible video formats: "DVD MOVIE" 920, "SVCD MOVIE" 925 and "HI-DEF MOVIE" 945. If either "DVD MOVIE" 920 or "SVCD MOVIE" 925 is selected, the instant invention will preferably read the stored parameter values for these video formats (step 930) and create an output video work (step 935) from the edited series of video clips and/or digital still images according to methods well known to those of ordinary skill in the art. Finally, the movie that is created at step 935 is written to non-volatile storage (step 940) where it can be archived for later reading/viewing.

If, on the other hand, the user indicated that a "HIDEF" movie is to be created (step 945) as a first preferred step the parameter specification of the currently connected display device (step 950) is automatically determined. This step will be discussed in greater detail below.

As a next preferred step the instant invention will optionally display the results of the automatic detection process to the user (step 955). This step has been made to be optional because in some preferred configurations the results will be silently passed on to step 975. The results of the detection step are preferably presented to the user using a graphic display similar to that illustrated in FIG. 5. If the user does not wish to modify the current parameter values (the "YES" branch of 960) the current parameters are assigned to be target parameters (step 975) and an output movie is calculated as is described hereinafter (steps 980 and 985).

If the user does not approve the results of the automatic analysis or if the user wants to create output material for another, not currently connected display device, user input will be needed (the "NO" branch of 960). The user will preferably be given an opportunity to select from a menu of alternative display devices/parameter combinations (step 970) or to manually set each parameter value (step 965). A graphical user interface that would be suitable for use with this step is illustrated in FIG. 6.

As a next step, the instant invention identifies the currently selected parameter values—whatever their source—as target values 975 for the "HI-DEF MOVIE" output format. Finally, the instant invention creates the output video work according to the general method illustrated in FIG. 10.

Figure 10:
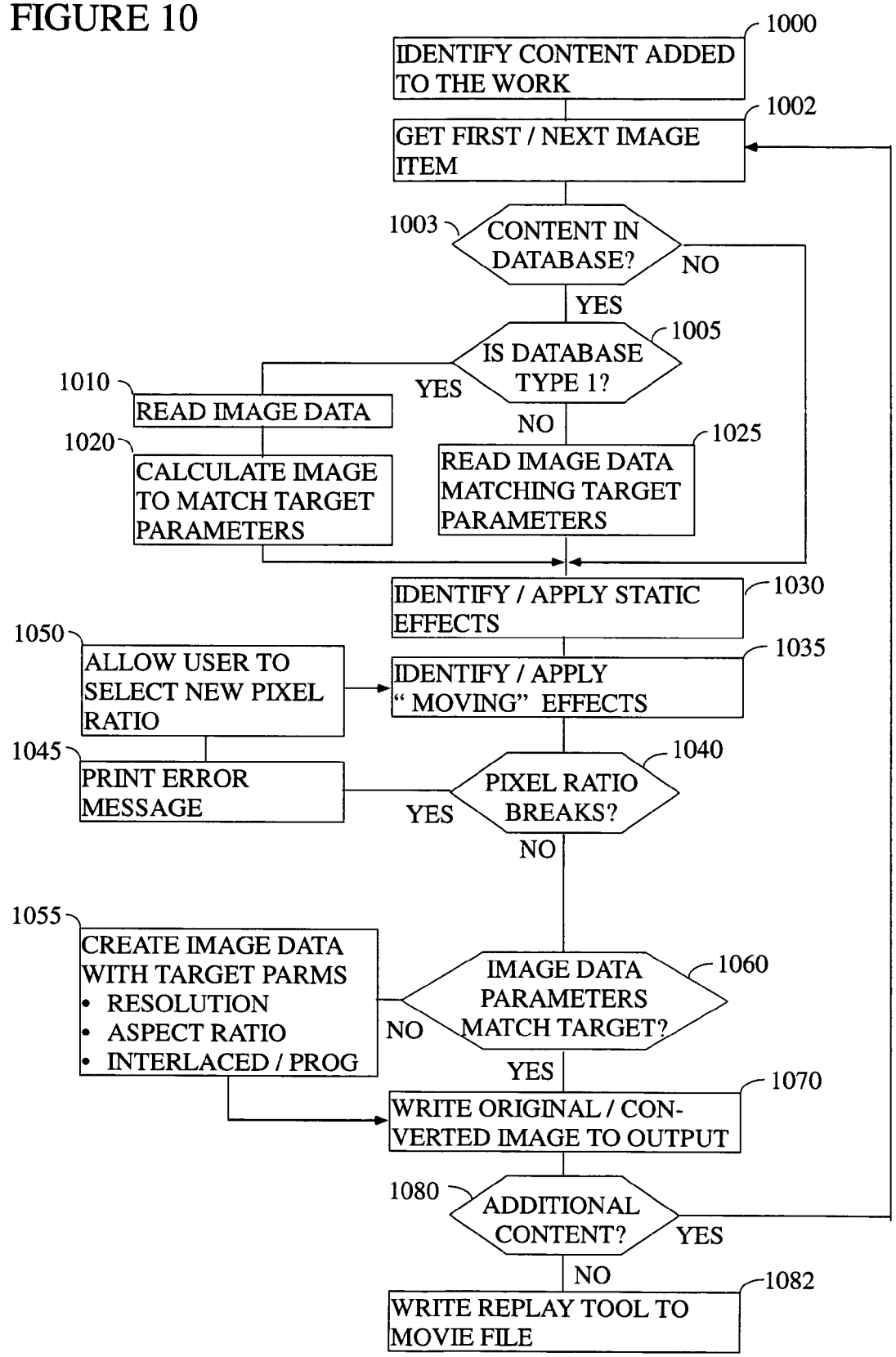
FIG. 10 depicts a flowchart that illustrates the specific steps of the instant invention in a second part of the creation process.

FIG. 10 illustrates some preferred steps that might be utilized during the creation of the video output (step 980). As a first preferred step, the instant invention will identify the media items that have been added to the work (step 1000), which items might consist of video clips, digital still photos, background/overdub audio, etc. Next, the instant invention will preferably enter a loop (steps 1002 through 1060) that sequentially examines each media item that has been selected by the user and prepares it for inclusion in the final video work.

As a next preferred step, the currently selected media data item will be examined (step 1003) to determine whether or not that media item is stored within one of the preferred database types discussed previously (i.e., FIGS. 7A and 7B). If not, the instant method preferably proceeds with the image-data as provided (i.e., the "NO" branch of step 1003). However, if the currently selected media item is an item that has been stored within a media database, different actions will be taken depending on the database type (step 1005). In the event that the database is a "type 1" database (i.e., a database of the sort described in FIG. 7A) the full resolution image (or video clip) will be read (step 1010) and then the image/clip will be modified to have parameters that match the target parameters (step 1020). However, if the database type is of the sort generally illustrated in FIG. 7B (i.e., a database that contains—or contains pointers—to alternative versions of the image data), the data file that has parameter values that correspond to the target values will simply be read from disk (step 1025) and used in the steps that follow.

In either case, a next preferred step would be to identify and apply any static effects that have been selected by the user (step 1030). For purposes of the instant invention, "static" effects are those that can be applied without requiring a change in the resolution of the underlying image, e.g., adjusting the color balance, brightness/contrast, fade in/fade out, etc. These effects should be understood in contrast to the "moving effects (e.g., digital zoom) that can create an output image that is effectively lower in resolution than the input.

As a next preferred step 1035, the "moving" effects will be applied. In the preferred arrangement, though, the resolution of the output image will be first determined so that, if the resolution dips below that permitted by the target parameters, the user can be alerted (step 1045) and thereafter given an option to modify the effect (e.g., reduce the degree of magnification in the zoom effect) so that the output image is not degraded (step 1050).

Next, a final check will be made to determine whether or not the display parameters of the selected image data item match the target parameters (step 1060). If not, the selected image will be modified to give it the appropriate parametric values. This might mean resizing the image (i.e., changing its resolution), changing its aspect ratio (e.g., by trimming or resizing), etc.

As a next preferred step, the image data (whether the original unmodified image or a recalculated version of the original) will be written to output (step 1070). Next, the instant method will preferably determine whether or not additional media items are available (step 1080) and, if so, they will be read and processed as described previously.

Finally, it is preferred in some embodiments of the instant invention that a replay tool will be written to storage along with digital video file (step 1082). For purposes of the instant disclosure, a replay tool will be understood to be a software program that has been customized to display the finished video work according to the parameters that are associated with the user's chosen output format. The software might present on-screen transport controls to the user (e.g., PLAY, PAUSE, STOP, FAST FORWARD, FAST REVERSE, etc.). One advantage of using such a tool is that it could make certain that the device on which the movie is being played is properly configured according to the parameters that were used to create the video work, e.g., to the extent that such is possible the replay tool will attempt to set the display device to the correct resolution, bit depth, etc., thereby creating the best possible viewing experience for the user.

Figure 11:
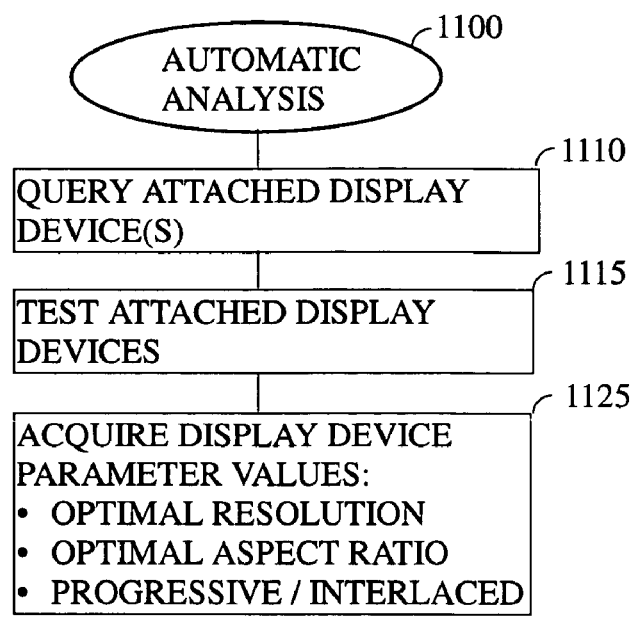
FIG. 11 depicts a flowchart which illustrates workflow of the automatic analysis step of the instant invention

Finally, FIG. 11 contains additional information about the process 1100 of automatically analysing the display parameters of an attached display device such as might be performed if the user had indicated that the resulting video work is to be a "HI-DEF MOVIE". As a first preferred step 1110, the attached device will be queried to determine its preferred display parameters. As is well known to those of ordinary skill in the art, such a query capability—including the ability to determine how many and what types of monitors are attached—is routinely provided on modern display hardware. Of course, methods of sending queries to and receiving information back from an attached device are similarly well known to those of ordinary skill in the art. However, in the event that such a capability is not provided (or in the event that the parameters returned do not include each of the target parameters) the instant inventors prefer that a brute-force test procedure be initiated to determine the device display parameters (step 1115). By "brute force" is meant that an attempt will be made by the instant invention to set the display to, for example, 1280×1024 resolution. If an error code is returned from the display device, the instant program will know that this resolution is not an option for this monitor. On the other hand, if no error is detected the instant invention will assume that this is one of the permitted display parameters for this device. Clearly, by trying a variety of parameter values (resolutions, aspect ratios, non-interlaced video, etc) it will be possible to manually map the acceptable parameter combinations for this device. Of course, instead of using a "brute force" approach, the instant invention might query the attached device to see if its manufacturer/model number can be determined. Given that information, the program could determine the relevant parameters by reference to an internal listing of monitors/parameters or it could query a remote database (e.g., via the Internet) to get the parameter values that it seeks.

After the foregoing tests have been completed, the instant invention will most likely have the display parameters that will be necessary for optimising the written video work for play on that device.

CONCLUSIONS

By way of summary, the instant invention preferably seeks to make it possible for a user to quickly and easily create high definition video works from high definition input materials. The instant invention will preferably provide a streamlined workflow in those instances where a user seeks to create a video work and incorporate image data that have been collected at two or more different resolutions. Further, the automatic display parameter detection functionality of the instant invention is designed to further assist the user in his or her quest to create a high quality HD movie.

It should be clear that an approach such as this would be a tremendous help for the average user when working with video clips and image data that are to be incorporated into a HD video work. The user will be able to create high definition output without understanding or specifying the numerous technical parameters that control the quality of HD material.

By utilizing the instant method a user will be able to readily create multiple versions of the same input material, wherein each version has been optimised for display on specific display devices thereby ensuring that the quality and integrity of the input material will be preserved.

Of course, many modifications and extensions could readily be made to the instant invention by those of ordinary skill in the art. For example in one preferred embodiment the instant invention might not be offered with a user accessible option to select the output format. Instead, the selection of the output format would be completely controlled by the device detection process, wherein according to the results of that analysis the output format is automatically chosen by the instant invention.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of preparing a video work for viewing on a high definition device, comprising the steps of:
   (a) obtaining a plurality of image items;
   (b) selecting a video parameter;
   (c) selecting at least two different parameter values for said video parameter;
   (d) selecting one of said image items;
   (e) conforming said selected image item to each of said at least two different parameter values, thereby creating at least two conformed image items;
   (f) storing said at least two conformed image items in a video database;
   (g) performing steps (b) through (f) for at least two different image items;
   (h) selecting a HD video format;
   (i) identifying a plurality of HD video parameters, wherein said plurality of HD video parameters collectively define said HD video format;
   (j) assigning a parameter value to each of said identified HD video parameters, wherein said assigned parameters values are consistent with said selected HD video format; and,
   (k) conforming said plurality of image items according to said plurality of parameter values thereby preparing said video work for viewing on said high definition device, wherein each of said plurality of image items is conformed by either,
      (k1) reading a conformed image item from said image database, or,
      (k2) calculating a conformed image.

2. A method of preparing a video work for viewing on a high definition device according to claim 1, wherein said HD video format is selected from a group consisting of 720p and 1080i.

3. A method of preparing a video work for viewing on a high definition device according to claim 1, wherein said image items are selected from a group consisting of a digital still photo, a digital video clip, a digitized analog video clip, a digitized analog still photo, and a scanner, and, said image items are acquired at at least two different image resolutions.

4. A method of preparing a video work for viewing on a high definition device according to claim 1, wherein said display parameters are selected from a group consisting of a video resolution, a frame aspect ratio, and a pixel aspect ratio.

5. A method of preparing a video work for viewing on a high definition display device, comprising the steps of:
   (a) obtaining a plurality of image items;
   (b) selecting a HD video standard;
   (c) identifying a plurality of HD video parameters, wherein said plurality of HD video parameters collectively define said HD video standard;
   (d) assigning a parameter value to each of said identified HD video parameters, wherein said assigned parameter values are consistent with said selected HD video standard;
   (e) selecting one of said image items;
   (f) selecting a video effect for application to said selected image item;
   (g) determining whether an application of said selected video effect to said selected image item would result in a pixel break,
   (h) if said application of said selected video effect would result in a pixel break,
     (h1) notifying the user of said pixel break,
     (h2) allowing said user to modify said selected video effect, and,
     (h3) calculating said modified video effect, thereby producing a modified video item, else,
     (h4) calculating said video effect, thereby producing a modified video item;
   (i) performing steps (e) through (h) at least once;
   (j) ordering said image items and said modified video items according to a user's specification; and,
   (k) automatically conforming said ordered image items to match said plurality of display parameters, thereby preparing said video work for viewing on said high definition display device.

6. A method of preparing a video work for viewing on a high definition device according to claim 5, wherein said HD video format is selected from a group consisting of 720p and 1080i.

7. A method of preparing a video work for viewing on a high definition device according to claim 5, wherein
   said image items are selected from a group consisting of a digital still photo, a digital video clip, a digitized analog video clip, a digitized analog still photo, and a scanner, and,
   said image items are acquired at at least two different image resolutions.

8. A method of preparing a video work for viewing on a high definition device according to claim 5, wherein said display parameters are selected from a group consisting of a video resolution, a frame aspect ratio, and a pixel aspect ratio.

9. A method of preparing a video work for viewing on an attached display device, comprising the steps of:
   (a) obtaining a plurality of image items;
   (b) identifying a plurality of display parameters describing said video work;
   (c) automatically determining a value for at least one of said display parameters, wherein at least one of said identified display parameter values is obtained directly from said attached display device, and wherein at least one of said display parameters is a video work resolution;
   (d) editing said plurality of image items into a draft video work; and,
   (e) selecting one of said image items;
   (f) selecting one of said plurality of display parameters;
   (g) selecting at least two different values of said selected display parameter;
   (h) conforming said selected image item to each of said at least two values of said display parameter, thereby creating at least two conformed image items;
   (i) storing said conformed image items in an image database;
   (j) performing steps (e) through (i) at least once;
   (k) automatically conforming all of said plurality of image items in said draft video work to match said plurality of display parameters by either
     (1) reading a conformed image from said image database, or,
     (2) calculating a conformed image; and,
   (l) combining any of said conformed images from step (k) into said video work for viewing on said attached display device.

10. A method of preparing a video work for viewing on a high definition display device, comprising the steps of:
   (a) obtaining a plurality of image items, wherein said plurality of image items are acquired at at least two different image resolutions;
   (b) selecting a HD video format;
   (c) identifying a plurality of video parameters, said plurality of video parameters collectively defining said HD video format;
   (d) assigning a parameter value to each of said identified video parameters, wherein said assigned parameter values are consistent with said selected HD video format; and,
   (e) ordering said image items according to a desire of a user;
   (f) selecting one of said ordered image items;
   (g) selecting one of said plurality of display parameters;
   (h) selecting at least two different values of said selected display parameter;
   (i) conforming said selected image item to each of said at least two values of said display parameter, thereby creating at least two conformed image items;
   (j) storing said conformed image items in an image database;
   (k) performing steps (f) through (j) at least once;
   (l) automatically conforming all of said ordered image items to match said plurality of display parameters by either
     (1) reading a conformed image item from said image database, or,
     (2) calculating a conformed image item, and,
   (m) combining any of said conformed image-items from step (l), thereby preparing said video work for viewing on said high definition device.

* * * * *